April 12, 1966   W. H. HAYWARD   3,245,256
LOW FLOW RATE METER
Filed Oct. 30, 1962
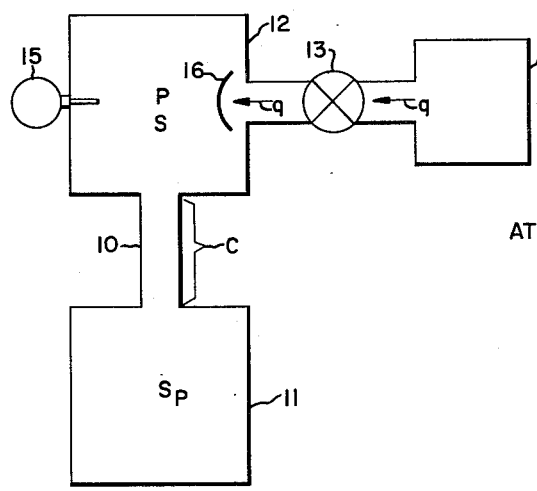
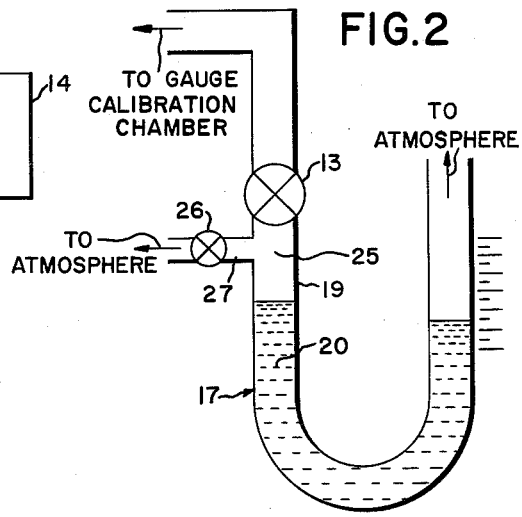
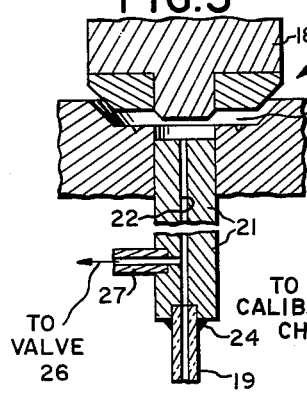
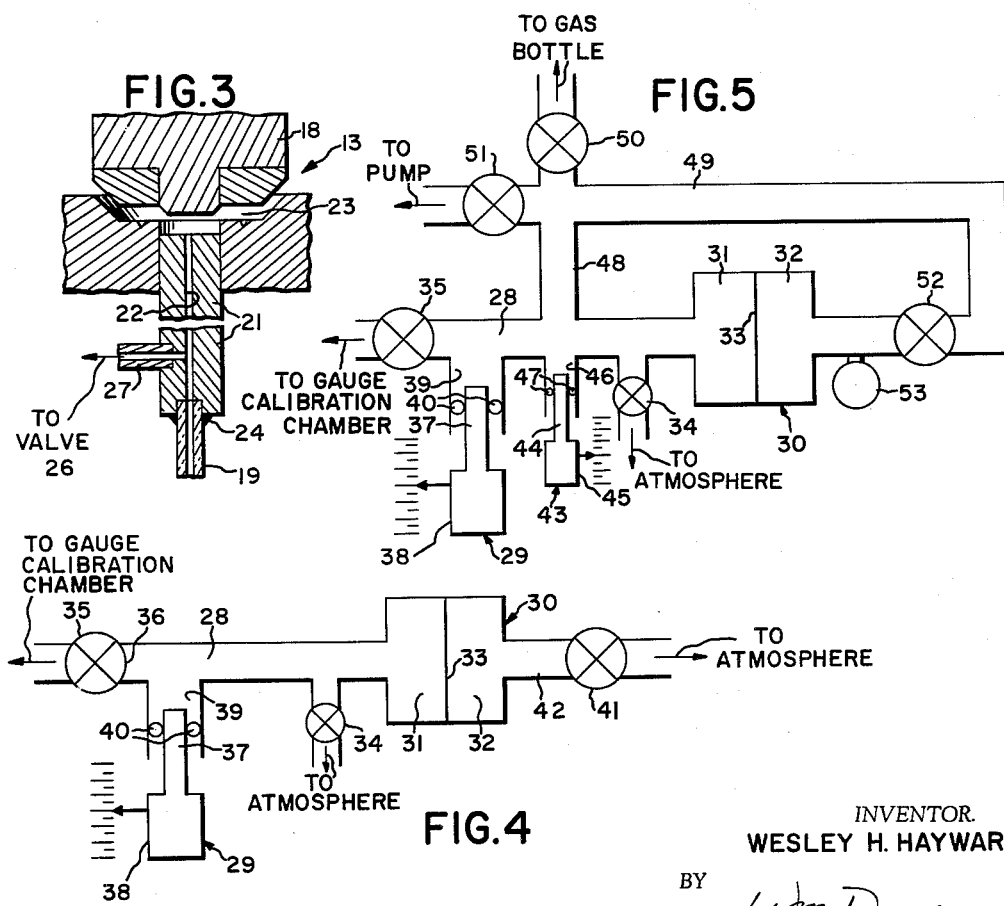
INVENTOR.
WESLEY H. HAYWARD
BY
*Wm J Nolan*
ATTORNEY United States Patent Office 3,245,256
Patented Apr. 12, 1966

3,245,256
LOW-FLOW RATE METER
Wesley H. Hayward, Mountain View, Calif., assignor to Varian Associates, Palo Alto, Calif., a corporation of California
Filed Oct. 30, 1962, Ser. No. 234,037
4 Claims. (Cl. 73—194)

This invention relates in general to flow meters, and more particularly to flow meters capable of measuring very small flow rates, of the type normally found in high vacuum technology.

The traditional method of performing absolute pressure calibration has been by means of the McLeod gauge. This instrument, however, has many difficulties associated with its use. Considerable skill and experience are required on the part of the operator. While some workers have attempted to use the McLeod gauge at pressures as low as $10^{-6}$ and $10^{-7}$ torr, considerable doubt exists as to its accuracy below $10^{-4}$ torr. There is even some doubt as to its accuracy at higher pressures.

Recent advances in vacuum technology make other approaches to the problem of absolute pressure measurement feasible and attractive. One such method for absolute pressure calibration is the "Calibrated Conductance" method. A pump of approximately know speed $S_P$ is connected to a gauge calibrating chamber through a tube having a calibrated conductance C. The pump speed S at the calibration chamber is related to C and $S_P$ through $$S = \frac{C}{1 + \frac{C}{S_P}}$$

If $S_P$ is large compared with C, the pumping speed S at the calibration chamber is essentially independent of $S_P$ and approximately equal to C. Gas is allowed to enter the gauge calibration chamber at a rate $q$ which is determined by a flow rate measuring instrument. The calibrating pressure P is thus $$P = \frac{q}{S}$$

A number of methods for determining flow rate have been used in the past. These include, for example, the motion of a mercury pellet or other liquid in a capillary or the motion of an oil column in a burette. Flow rate measurements by these methods have been limited to minimum flow rates of $10^{-3}$ to $10^{-4}$ torr liters/sec.

The object of the present invention is to provide a novel flow meter which is simple to operate, renders accurate measurements below $10^{-4}$ torr liters/sec. and which is suitable for general use in the high vacuum region, as, for example, in systems for accurately measuring pressure to thereby calibrate pressure gauges.

One feature of the present invention is the provision of a flow meter which is capable of accurately measuring flow rates below $10^{-4}$ torr liters/sec.

Still another feature of the present invention is the provision of a flow meter which is a constant pressure device.

Another feature of the present invention is the provision of a constant pressure flow meter which utilizes a very sensitive differential pressure meter.

Another feature of the present invention is the provision in a constant pressure flow meter of the above type of a variable volume element.

A further feature of the present invention is the provision of a novel system for accurately measuring pressure below $10^{-3}$ torr, useful, for example, in calibrating pressure gauges.

These and other objects and features of the present invention and a fuller understanding of the invention may be had by referring to the following description and claims, taken in conjunction with the following drawings in which:

FIG. 1 shows a diagrammatic view of a system for calibrating pressure gauges in the high vacuum region;
FIG. 2 shows a diagrammatic view of a flow rate measuring instrument of the present invention;
FIG. 3 shows a fragmentary cross-sectional view of a leak valve in open position and of the gas inlet chamber of the flow rate measuring instrument of FIG. 2,
FIG. 4 shows a diagrammatic view of a preferred embodiment of a flow rate measuring instrument of the present invention; and
FIG. 5 shows a diagrammatic view of another preferred embodiment of the present invention.

The method for absolute pressure calibration selected is a "Calibrated Conductance" method. Referring to FIG. 1, a pump 11 of known speed $S_P$ is connected to a gauge calibration chamber 12 through a long tube 10 having a calibrated conductance C. The pump speed S at the gauge calibration chamber 12 is related to C and $S_P$ through.

$$S = \frac{C}{1 + \frac{C}{S_P}}$$

If $S_P$ is large compared with C, the pumping speed S at the gauge calibration chamber 12 is essentially independent of $S_P$ and approximately equal to C. Gas is allowed to enter the gauge calibration chamber 12 by means of leak valve 13 at a very steady rate $q$ which is determined by a flow rate measuring instrument 14 connected in series with the leak valve. The ionization gauge 15 to be calibrated is placed within the gauge calibration chamber 12 and away from the point at which gas is entering the gauge calibration chamber 12 so as to avoid streaming effects. A baffle 16 may be used to further eliminate inaccuracies due to the streaming effect of the gas. By measuring the flow rate $q$, and combining it with the known pumping speed S approximately equal to C, the absolute pressure P of the gauge calibration chamber 12 may be determined through $$P = \frac{q}{S} \approx \frac{q}{C}$$

and the gauge calibrated by comparing its reading with the calculated P.

Heretofore this method of measuring the absolute pressure of evacuated chambers has been limited for the reason that available flow meters would only measure flow rates down to $10^{-3}$ or $10^{-4}$ torr liters/sec.

Referring now to FIGS. 2 and 3, a flow meter of the present invention is shown. A manometer 17 is connected to the leak valve 13 on its high pressure side below the leak valve seal 18. The manometer 17 is preferably a U-shaped glass tube 19 with a column of liquid 20 contained therein. A plug 21 of generally cylindrical shape having a central bore 22 is inserted within the high pressure side 23 of the leak valve 13. One end of the glass tube is connected as by brazing or by a high vacuum seal 24 to the plug 21 so as to define a completely enclosed gas inlet chamber 25 between valve seal 18 and the column of liquid 20. Gas may be periodically introduced into the chamber by means of another valve 26 which is connected on one side through a small conduit 27 to the gas inlet chamber 25 and on the other side to the atmosphere. Instead of a manometer, a U-tube barometer could also be used.

Operation of the flow meter is as follows. Leak valve 13 and valve 26 are held open so as to permit a flow of gas at atmospheric pressure into the gas inlet chamber 25 and a flow of gas at some unknown rate into the gauge calibration chamber 12 until equilibrium is established. Valve 26 is then closed. A quantity of gas Q at atmospheric pressure is thus within the gas inlet chamber 25 and is escaping into the gauge calibration chamber 12 at a rate $q$. The flow rate $q$ is defined as $$q = \frac{dQ}{dt} = \frac{PdV}{dt} + \frac{VdP}{dt}$$

By measuring P and V as functions of time the value $q$ may be obtained.

In order to use this method effectively for the measurement of small flow rates, the volume V of confined gas and the cross-sectional area of the manometer tube 19 must be made as small as feasible. By using a glass tubing with a 1 mm. bore and by using a leak valve 13 with the plug 21 inserted into the high pressure side 23 of the leak valve 13 so as to further reduce volume, a volume of V .08 cm.$^3$ was obtained. Mercury was found to be the most suitable liquid. Because of surface tension effects in the small bore glass tubing employed, other liquids did not prove as satisfactory. Upon utilizing a displacement of 3 cm. in the height of the mercury column in the U-tube, the total quantity of gas flowing through the leak valve is $Q=1 \times 10^{-2}$ torr liters. For a measurement time of $10^3$ seconds the flow rate is $q=1 \times 10^{-5}$ torr liters/sec. Smaller flow rates can be determined using larger measurement times or, with reduced accuracy, smaller motions of the mercury column.

Calibration pressures of $P=10^{-6}$ torr ($q=1\times 10^{-5}$ torr liters/sec., $S\approx C = 10$ liters/sec.) have been achieved using a 280 liter/sec. getter-ion pump. With a calibration time of 20 minutes the estimated accuracy of this measurement was ±12%. By employing longer calibration times the measurements could be extended to lower pressures.

While the simplicity of this type of flow meter is appealing and gives substantially better results than prior art devices, it has certain disadvantages. The major source of error in measurement arises from the uncertainty in the knowledge of the small volume V. Accurate estimates of volume which are small and of complex geometry are difficult to make. Secondly, the flow rate is not constant because of the changing pressure of the confined gas. In addition, mechanical problems arise in making geometrically well defined seals between the glass U-tube and the metal leak valve.

Referring now to FIG. 4, a preferred embodiment of the flow meter of the present invention is shown. The flow meter comprises a gas inlet chamber 28, a variable volume element 29 connected to the interior of the gas inlet chamber 28 and a very sensitive differential pressure meter 30 having two small chambers 31 and 32 separated by a membrane 33 and connected to the gas inlet chamber 28 in such a way that the sensitive membrane 33 of the differential pressure meter 30 forms one wall of the gas inlet chamber 28. Another valve 34 for periodically introducing gas into the gas inlet chamber 28 from the atmosphere may be connected to the base of the gas inlet chamber 28.

The gas inlet chamber 28 which is of generally cylindrical shape and of very small volume is connected, as, for example, by brazing, to the high pressure side of a leak valve 35 below its valve seal 36. The variable volume element 29 may comprise a metal rod 37 driven by a micrometer screw 38. The rod 37 is inserted into the gas inlet chamber through a cylindrical passage 39. A rubber "O" ring 40 is used at the base of the passage for creating a good seal around the rod 37. In the interest of using all metal construction, a calibrated bellows could be used for the variable volume element.

Any differential pressure meter may be used so long as it is extremely sensitive to slight changes in pressure. For example, it may employ a pair of test chambers 31 and 32, one of which is connected and open to the gas inlet chamber 28, and separated by a thin metal membrane 33. A valve 41 is connected on one side to chamber 32 by conduit 42 and on the other to the atmosphere. A net pressure difference between the test chambers 31 and 32 causes a displacement of the membrane which is detected electronically as a change in capacitance.

Operation of the flow meter is as follows. With valve 41 open, leak valve 35 and valve 34 are opened so as to permit a flow of gas at atmospheric pressure into the gas inlet chamber 28 and a flow of gas at some unknown rate into the gauge calibration chamber 12, until equilibrium is established. Valves 34 and 41 are then closed. A quantity of gas Q at atmospheric pressure is thus within the gas inlet chamber 28 and is escaping into the gauge calibration chamber 12 at a rate $$q = \frac{dQ}{dt} = P\frac{dV}{dt} + V\frac{dP}{dt}$$

However, in this device the pressure within chamber 28 is held at a value $P_o$ by varying the volume at such a rate that a null reading is maintained on the differential pressure meter 30. Thus $$q = \frac{P_o dV}{dt} = P_o \frac{\Delta V}{\Delta t}$$

Since the pressure remains constant, the leak rate will remain constant as long as the leak valve 35 is stable. Also, it is not necessary that the exact volume of the gas inlet chamber 28 be known although again it should be of very small volume. Using a ⅛ inch diameter rod 37 for a variable volume element, a flow rate of $1 \times 10^{-6}$ torr liters/sec. was measured in 10 minutes with an estimated accuracy of ±5%. Smaller flow rates can be measured in correspondingly longer times with equal accuracy. Accuracies of ±1% and better can be achieved by increasing the time intervals used in the flow rate measurements.

The pressure in the calibration chamber may now be calculated through $$P = \frac{q}{S}$$

Pressure calibrations of $P = 1 \times 10^{-7}$ torr have been achieved with an estimated accuracy of ±7%.

Referring to FIG. 5 another preferred embodiment of the present invention is shown. A second variable volume element 43 is connected to the gas inlet chamber 28. This second variable volume element 43 may also comprise a rod 44 driven by a micrometer screw 45 but with a diameter much smaller than variable volume element 29, and inserted into gas inlet chamber 28 through a cylindrical passage 46 using an "O" ring seal 47.

Conduits 48 and 49 connect a gas bottle through a valve 50 and also connect a pump through valve 51 to gas inlet chamber 28 and to the differential pressure meter chamber 32 through valve 52. A pressure gauge 53 is inserted within the gas inlet system.

With leak valve 35, valve 34, and valve 50 closed, and valves 51 and 52 opened, the gas inlet chamber 28 is evacuated by a pump. Valve 50 is opened and a quantity of gas is allowed to enter the gas inlet chamber system until a desired pressure is attained as measured by pressure gauge 53. Valves 50, 51 and 52 are closed and the pump turned off. Leak valve 35 is opened and gas is allowed to flow into the gauge calibration chamber 12. Pressure is held constant at some value $P_o$ by varying the volume at such a rate that a null reading is maintained on the differential pressure meter 30 from which $$q = \frac{P_o dV}{dt} = \frac{P_o \Delta V}{\Delta t}$$

This system has the following advantages. If for some reason one wishes to use gases other than air, any gas may be introduced into the system from a gas bottle through valve 50. The flow rates that can be measured are dependent on $P_o$, the initial pressure in the gas inlet chamber 28. With an initial $P_0$ less than atmospheric even smaller flow rates can be measured. Hence, by first pumping down the gas inlet system to less than atmospheric, the range of the flow meter can be extended further downward. To maintain constant pressure within the gas inlet chamber 28 the volume must be varied. With larger flow rate measurements the larger variable volume element 29 might be used. But when measuring slower flow rates, the same variable volume element 28 may not move enough to give accurate readings. Hence in such instances a small variable volume element 43 would prove useful.

Although the invention has been described in its preferred form with a certain degree of particularity it is understood that the present disclosure of the present form has been made only by way of example and that numerous changes in the details of construction and the combination and arrangement of parts may be resorted to without departing from the spirit and the scope of the invention as hereinafter claimed.

What is claimed is:

1. A flow meter for measuring the flow of gas into a low pressure region comprising, means for leaking a flow of gas into said low pressure region, a gas inlet chamber of very small volume having gas impervious walls and a quantity of gas contained therein at an initial pressure connected to said leak means, means for sensing changes in pressure within said gas inlet chamber, said means comprising a differential pressure meter including a first small volume, a second chamber and a thin gas impervious flexible membrane sensitive to slight changes in pressure separating said first and second chambers, said first chamber forming a portion of said gas inlet chamber, said membrane forming a portion of said gas impervious walls, means for establishing and maintaining within said second chamber a pressure identical to the initial pressure within said gas inlet chamber, first means subjected to the pressure within said gas inlet chamber for varying the volume of said gas inlet chamber so as to maintain constant pressure within said gas inlet chamber, and means cooperating with said volume varying means for measuring the changes of volume of said gas inlet chamber.

2. The flow meter according to claim 1 wherein said means for establishing and producing within said second chamber a pressure identical to the initial pressure within said gas inlet chamber comprises a valve connecting said second chamber to said gas inlet chamber, said valve closed when gas is allowed to flow from said gas inlet chamber into said low pressure region, said valve open prior to said gas flow to establish identical initial pressures in said gas inlet chamber and said second chamber.

3. The flow meter according to claim 1 including a second means for varying the volume of said gas inlet chamber, said second means being more sensitive than the first means for varying the volume of said gas inlet chamber.

4. The flow meter according to claim 1 including an additional valve means connecting said gas inlet chamber to a source of pressure.

References Cited by the Examiner
UNITED STATES PATENTS

| | | | |
|---|---|---|---|
| 412,830 | 10/1889 | Bosworth | 73—4 |
| 750,752 | 1/1904 | Cole | 73—407 X |
| 1,134,316 | 4/1915 | Collette | 73—4 |
| 1,173,038 | 2/1916 | Roschanek | 73—407 |
| 2,494,673 | 1/1950 | Smith | 73—194 |
| 2,708,365 | 5/1955 | Lindars | 73—194 |
| 2,961,868 | 11/1960 | Hooper | 73—149 X |

RICHARD C. QUEISSER, *Primary Examiner.*

E. D. GILHOOLY, *Asisstant Examiner.*